Patented Oct. 18, 1938

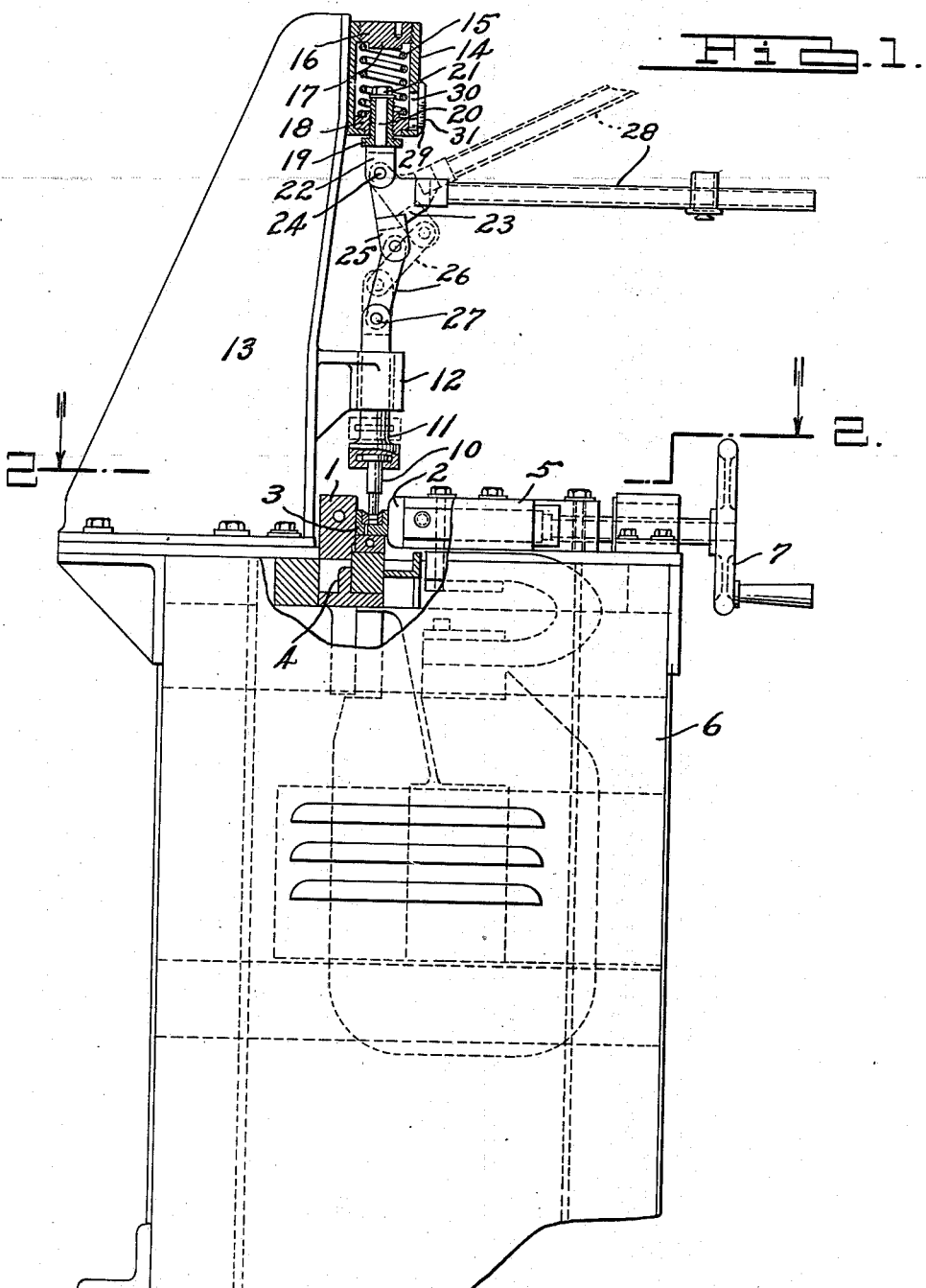

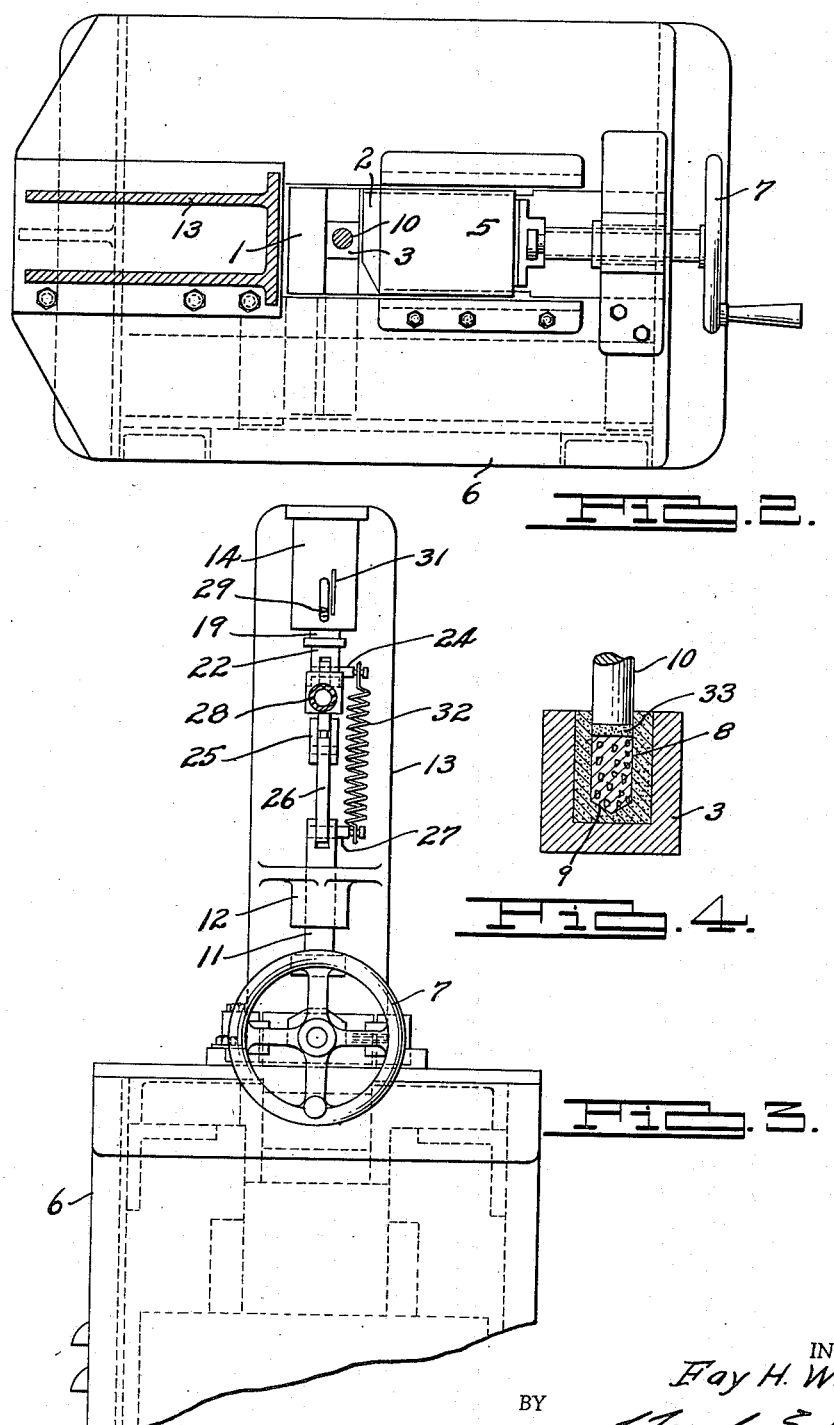

2,133,495

UNITED STATES PATENT OFFICE 2,133,495

METHOD OF MAKING A HARD AND COMPACT METAL FOR USE IN FORMATION OF TOOLS, DIES, ETC.

Fay H. Willey, Detroit, Mich.

Application February 15, 1937, Serial No. 125,736

10 Claims. (Cl. 75—137)

This invention relates to the method of forming hard, compact metal bodies suitable for tools such as cutting, drilling and surfacing tools, drawing dies, molds and other implements required to be formed of a hard metal and commonly formed of a composition of metals such as any of the metals of the 6th group of Mendelejeff's Periodic Table together with a metal of the iron group, carbon and additive elements such as molybdenum, chromium, boron, silicon, antimony etc.

This application is a continuation in part of my application Serial No. 24,068, filed May 29, 1935, which has issued as Patent 2,074,038, dated March 16, 1937, the invention herein disclosed not being confined in specific quantities or characters of the materials utilized which may vary considerably due to the character of the tool to be produced as hereinafter described.

Heretofore, in this general art, it has been proposed to make a metal body of a number of elements by powdering the same and submitting the powder to pressure and sometimes heat to form a solid body and then submitting the same to a sintering temperature in a furnace, the sintering temperature being from around 1100 to 1350 degrees C., depending somewhat upon the composition.

Examples of this type of tool and method of making the same are disclosed in the U. S. patents to Schroter, Nos. 1,551,333 and 1,727,909, Gilson, No. 1,756,857 and others. In all of these cases the bodies are submitted to a sintering temperature as a final treatment and are what is ordinarily termed "solid bodies" that, nevertheless, have voids more or less and therefore do not provide the desired density and also are more or less but not uniformly granular and therefore to some degree unfitted for formation of the highest type of element such as a die, abrading, or cutting tool, element of wear resistant character as the sintered material will not take a uniformly high polish by a grinding operation and therefore does not provide the best structural characteristics suiting the same for use as bushings or centers for lathes and various other places where a hard and dense tool or element is required.

It is pointed out that this invention is not confined to the specific quantities of the materials utilized but rather to the method whereby the elements may be formed into a tool of the greatest compactness and to a commercial degree free from a granular condition.

An object of the invention further is to reduce the time required in the formation of the tool in comparison with the sintering method, as heretofore performed.

By my improved method as is hereinafter more fully described, I am able to make a tool from the powdered materials to a final formation of the same in a period of less than five minutes and the tool produced by the method is superior to the tools formed by the sintering methods now commonly in use and suggested by the above mentioned Letters Patent of the United States. Thus the invention exists in the method of formation of the metal body rather than in any specific composition utilized.

These objects and features of the invention are attained by means of a press which may be of any approved form in which the entire treatment of the material takes place and in the use of which gases are eliminated from the material and thus voids prevented and due to the temperatures and pressure employed in the final stages, a very hard dense body is produced which may thereafter be finally shaped in the formation of the desired character of implement or device.

These and other objects and features of the invention are hereinafter more fully described and claimed, and a machine by which the process may be readily performed is shown in the accompanying drawings in which—

Fig. 1 is a side elevation partly in section of a convenient form of press utilized in the formation of the implement.

Fig. 2 is a plan view of the bed of the machine taken on line 2—2 of Fig. 1.

Fig. 3 is an elevation of the upper part of the machine taken from the right side of Fig. 1.

Fig. 4 shows a mold with an article therein in the process of being formed.

The mechanism shown for producing the article is an electric welding machine which, as shown in Fig. 1, has the water cooled electrodes 1 and 2. A crucible is shown at 3 as being positioned therebetween and resting upon a water cooled base 4. These electrodes are apertured as shown to permit water to flow through the body thereof, the water supply conduits therefor not being here shown, nor are the electric circuits for the electrodes shown as such element is usual in electric welding machines. The electrode 2 is supported in a carrier 5 which is movable on the base 6 of the machine by means of a hand wheel 7, the electrode 2 being retracted to permit introduction of the crucible and then moved forward by means of the screw until the crucible is held in pressure contact between the electrodes. The crucible may be carbon or graphite or a metal crucible lined with carbon or graphite. In either case, the graphite element is recessed as indicated at 8 in Fig. 4 and is preferably slightly coned at the bottom 9. A vertically reciprocable plunger 10 has a molybdenum or other hard metal tip for entering the recess and is supported by the holder 11 reciprocable in the bracket 12 attached to the standard 13 which in turn is supported on the base 6. The bracket 12 supports the holder from lateral displacement and sustains it in truly vertical position.

The upper end of the standard 13 has a chambered head 14 secured thereto within which is a coiled spring 15. The upper end of the chambered member is threaded to receive a plug 16 having a central projection 17 engaging in the end coil of the spring and centering the same and this may be adjusted to increase or decrease the normal tension on the spring.

At the bottom of the chambered member 14 is a spring seat 18 having a projection entering the bottom coil of the spring to center the same and the member 18 is centrally threaded to receive a threaded sleeve 19 which is adjustable longitudinally in the spring seat 18. A stub shaft 20 extends through the sleeve and is secured in place by the nut 21. The lower end thereof is in the form of a yoke 22 which receives a plate 23 pivoted thereto by a pin 24. The opposite end of the plate is formed with a yoke 25 in which an end of the link 26 is pivoted, the opposite end being pivoted to the upper end of the holder 11 by the pin 27. To the plate is secured a handle 28. The link and plate form a toggle between the yoke 25 at the upper end and the holder 11 at the lower end and by operation of the handle, the holder and the plunger member or tamp 10 may be reciprocated. The normal position of the parts is indicated by dotted lines in Fig. 1 and when pressure is applied to the material in the crucible or mold, the handle 28 is moved downwardly as indicated by full lines in Fig. 1.

In order that pressures to be applied may be determined, the screw seat 18 is provided with a finger 29 extending through a slot 30 in the chambered member 14 and a calibrated gauge plate 31 is secured to the member 14 across which the finger is movable enabling the operator to determine the pressure applied by downward movement of the handle 28. The pivot pins 24 and 27 extend to one side of the leverage mechanism as shown in Fig. 3, and a coiled spring 32 is attached thereto tending normally to hold the handle up with the plunger 10 out of the recess of the crucible as shown in dotted lines in Fig. 1.

One of the purposes of use of the welding machine or like instrumentality is to enable the article to be completely formed therein. It has heretofore been the practice to compact a material and even to heat it somewhat in a machine of this character and then remove the mold or crucible and complete the temperature treatment in a furnace or to remove the material after heating sufficiently to retain its shape and subjecting it to a sintering temperature in a furnace. However, in the method hereinafter described and in order to secure a tool of the proper hardness and density, the entire treatment of the material is completed in the welding machine thus not only saving the labor cost of handling but also saving considerable equipment and permitting the tool to be completed under a high pressure while it is at a temperature above the sintering temperature and it also enables the entire process to be performed while the material is prevented from oxidation as it is protected from atmosphere during the forming operation and also by being encased in a graphite crucible and at the temperature attained creates a reducing atmosphere.

This in turn unites with the oxygen present to form carbon monoxide which is driven off as a gas by the pressure obtained thereby removing the oxide from the material.

As an instance and not by way of limitation, I form a powder containing approximately 60 to 70 per cent tungsten (W) and 3 to 5 per cent carbon (C) and the balance nickel (Ni) and ball mill the same for a number of hours sufficient to produce a very fine powder. Usually the material is placed in the mill in more or less of a granular form and ball milled for upwards of 400 hours, dependent more particularly upon the character of the material, it being desirable to produce a powder of great fineness such for instance as will pass a 350 mesh screen or finer. In forming a hard metal body of any suitable specific composition, a small quantity of the powder is placed in a graphite mold and pressed or tamped by the plunger 10 of the press through operation of the handle 28, the pressure being insufficient to raise the spring seat 18. A second quantity is then placed in the crucible and tamped and this is repeated until the desired depth in the mold is secured. This depth, as may be previously determined by experience, is such that the tool, when completed, will be of the proper length and somewhat less than the length of the tamped material. A graphite button of a size to slidably fit in the mold, as indicated in Fig. 4, is placed on the top of the material and pressure applied thereto and at the same time electric current is applied to the electrodes.

The pressure is comparatively light in this first step and the temperature is sufficient to bring the material to about 800 degrees C. for a short period and then current is cut off and the pressure released usually by withdrawal of the plunger to more readily permit the gases to escape from the mold. During this interval the material cools quite rapidly due to the water cooling the electrodes in contact with the mold or crucible. Then a higher degree of pressure is applied and current supplied to the electrodes and the material is then held under pressure until a higher temperature is secured which may be determined in the usual manner. This heating under pressure and cooling proceeds through three or four successive stages of about one minute each in the making of a tool or tip of approximately an inch in length and a diameter of about fifteen-sixteenths of an inch. With the specific composition above mentioned, the last stage should be at the temperature of the order of 1700 degrees C., and a pressure of about 10,000 pounds per square inch. This will produce a plastic, or not quite molten, condition of the metal and, as gases have been constantly driven off from the material or absorbed in the previous stages of heating and cooling, this final stage is performed with practically no gas present in the body under pressure and the metals practically alloy at approximately the temperature stated and produce a body that is free of voids and of granular appearance, and of great hardness and density. By the successive stages of increasing temperature and pressure and time period therebetween, opportunity is provided permitting completion of the reaction between the tungsten powder (W) and the free carbon (C). If the powdered material be brought to final high pressure and temperature in a single step, the resultant alloy will be of a coarse grained crystalline form and on polishing will show free carbon.

In the sintering process heretofore in use, the metal has not been very highly heated prior to being placed in a furnace and raised to sintering temperature. In thus raising the temperature from about 800 degrees C. to approximately 1350 degrees C. which is the sintering temperature of the composition, considerable gas is produced which tends to cause the voids heretofore mentioned. My improved process distinguishes in that the heating is very rapid and not slow as in the furnace at sintering temperature and is maintained under high pressure at a temperature above sintering so that the material approaches a molten condition and a more perfect alloy is secured as well as much greater density.

The above materials in the operation take up carbon from the crucible and tend to form a highly carburized surface of the treated metal and the tungsten, nickel and carbon combine to form a very hard and tough structure not brittle in character and therefore free from cracking or shatter of the tool in use. The same materials at sintering temperature in the metals heretofore utilized are naturally more brittle and also due to the voids present therein, provide a tool that will readily break under shock or impact all of which is avoided by my improved process.

The above description of procedure with the tungsten, nickel and carbon is only given by way of example. With a different percentage of nickel for instance, or different materials as has heretofore been indicated, the final temperature may vary somewhat due to differences in melting point temperature etc., the essential characteristics of the process being that preferably the metals are only brought to a condition just short of the molten condition as heretofore stated. Principally because if a molten condition or liquefaction of the metal exists it is difficult to hold it under the pressures to which the material is submitted at the high temperature. It is pointed out, however, that with a proper character of mold and proper character of fitting of the plunger 10 or the button 33 the material could be brought to a molten condition without material loss of metal. The invention therefore is not restricted to the exact temperatures above set forth because it is possible to carry the temperatures higher even with the specific composition set forth and also the temperatures may be lower than is stated with the specific composition due to the melting point of the composition being lower. It is preferable to submit the material to about four stages of increasing heat and pressure in bringing the material to the final temperature and pressure and removal of the plunger from the mold at each step to permit escape of the gases as it is essential that the gases should be practically excluded or absorbed prior to the final heating and pressure.

It is also evident that variation in the composition is within the scope of the invention because some implements or articles require to be less hard than others and to have other qualities or characteristics than hardness or wear resistance as will be readily understood by those familiar with present day tools of the tungsten carbide type—that is, the tungsten may be replaced with some other element or used in less quantity and other elements included such as titanium or other metal of the 6th group of Mendelejeff's Periodic Table. The principal other element is a metal of the iron group—that is, iron, cobalt or nickel as may best serve the purpose in securing practically an alloy of materials and avoid granular condition.

In all the experiments that I have performed with different metals of the groups stated or different percentages of metals, the final temperature has not exceeded 1850 degrees C. and may be as low as approximately 1500 degrees C. and preferably at least slightly above a sintering temperature for the composition.

A major feature of the invention resides in the use of a high pressure at approximately the alloying temperatures of the metals utilized. It is also preferable that in case of use of any of the metals of the 6th group of Mendelejeff's Table, it is desirable that its avidity for carbon should be unsatisfied but not wholly so as the metal having the avidity for carbon will, during the process, absorb some carbon from the crucible or mold.

While I have shown a machine having only a single plunger and therefore capable of making but one element at a time, it is obvious that the machine may have several plungers and arranged to apply current to a corresponding number of crucibles whereby a number of metal elements may be made in the same time period.

It is further to be realized that the time period may be varied but in the specific compositions hereinbefore mentioned, of tungsten, nickel and carbon, the succeeding steps of increasing temperature and pressures may each be performed within a time period of even less than one minute in about four steps including the first and final heating step but the steps may be increased in number if desired or as may be required with some compositions and the period of time may be varied without departing from the spirit and scope of the invention as set forth in the appended claims.

From the foregoing description, it is believed evident that the various objects and features of the invention are attained by the method of formation of the hard metal article as hereinbefore described, and that the major features of the invention reside in the formation of an alloy of metals such as hereinbefore stated while the material is protected from atmosphere to prevent an oxidation thereof and that the entire series of steps except the ball milling of the material to form the powder may be performed in a single purpose machine and with great rapidity and provide an article of greater density and hardness than has heretofore been secured by the previously known sintering method.

Having thus fully described my improved process for forming various articles to secure a hard and compact metallic body, what I claim and desire to secure by Letters Patent of the United States is—

1. The method of making a hard, dense metal body for the formation of various devices such as described, which consists in reducing to finely powdered form a metal of the 6th group of Mendelejeff's Table in major quantity, a metal of the iron group in minor quantity, the presence of which reduces the melting point temperature of the alloy, a quantity of carbon less than that required to satisfy the avidity of the metal of the first group therefor, a small quantity of metal for enhancing the toughness and tensile strength of the body, placing a quantity of the powdered material in an open ended graphite crucible, positioning the same in a press having a plunger for entering the open end of the mold, placing a carbon button on the top of the material in the mold for engagement with the plunger, and submitting the material to heat as by means of an electric current and to pressure by means of the plunger in a series of steps of first a comparatively low temperature and pressure to start degasification of the materials, removing the plunger to permit an escape of the gases and then, through a succeeding series of more than two steps of increased pressure and heating and elimination of gases until a final step of high pressure and temperature at which the materials will alloy is attained.

2. The method of forming a hard and dense metal body for the making of tools, dies and the like which consists in the forming of a very fine powder of the following composition—namely, a metal of the 6th group of Mendelejeff's Table in major quantity, a minor quantity of metal of the iron group, and a percentage of carbon, then filling a mold with the powdered material positioned therein in small quantities and tamped as the mold is filled, then subjecting the mass to a light pressure and heating the material to a temperature of approximately 800 degrees C., then, by succeeding steps of increased temperature and pressure and elimination of the gases therebetween, raising the same to a temperature in the neighborhood of 1700 degrees C. while under a pressure of approximately 10,000 pounds per square inch, allowing the same to cool between the succeeding steps, and finally removing the same from the mold.

3. The method of forming a hard and compact metal body for the formation of various implements such as described, which consists in reducing a composition containing the desired metals and carbon to a very fine powder, placing the same in a mold and then subjecting the same to a low pressure and heat to start degasification of the material, permitting the gases to escape from the body, and then, in a series of succeeding steps of increasing pressure and temperature and an intervening period of reduced pressure and temperature permitting discharge of the gases therebetween, finally submitting the same to a pressure of approximately 10,000 pounds per square inch and to a temperature at which the metals will alloy, and then, when cooled, removing the same from the mold.

4. The method of making a hard compact metal body which consists in first reducing to finely powdered form a metal of the 6th group of Mendelejeff's Periodic Table in major quantity, a metal of the iron group in minor quantity, and carbon insufficient in quantity to satisfy the avidity of the metal of the first mentioned group therefor, subjecting the powdered material to pressure and heat in a form in a series of successive steps of increasing pressure and temperature and relieving the material of pressure and temperature between the steps to permit an escape of gases, and as a final step, submitting the material to a high pressure and a temperature productive of a plastic condition of the materials practically free from gases within the body thereof whereby a dense and hard metal body is formed.

5. The method of producing a hard compact metal body free from voids and granular condition which consists in first forming a powder of a number of metals and free carbon productive of an alloy having the desired physical characteristics, placing the powdered material in a mold and then under a series of rapidly succeeding steps of increasing pressure and temperature and time period therebetween for elimination of generated gases between the steps until a final pressure of approximately 10,000 pounds per square inch and a temperature at which the materials become plastic is attained.

6. The method of forming a hard compact metal body for the production of various implements such as described which consists in first forming a fine powder of a number of elements together productive of the required physical characteristics and then forming an alloy of the metals by submitting the powder while in a mold and shielded from atmosphere to a series of successive steps of increasing pressure and temperature and cooling between the steps until a plastic condition of the materials is produced while under a pressure of approximately 10,000 pounds per square inch.

7. The method of making a hard and compact metal body which consists in submitting a finely powdered mass of metals while in a mold to a series of steps in which the metal is heated under successively increasing pressure and temperature and an intervening time period wherein the metal is cooled and freed of formed gases, until a final pressure of approximately 10,000 pounds per square inch is attained as the metals are at alloying temperature.

8. The method of forming a hard and compact metal body which consists in submitting a series of metal elements together productive of the desired hardness and while in a mold and in a finely powdered form to a rapidly succeeding series of steps of increasing heat and pressure, and cooling the material between the said steps until the material finally attains a plastic condition while under high pressure.

9. In a method of forming a hard and compact metal body for the purpose of making implements requiring such characteristics, the step which consists in submitting the material while in a mold to pressure and heat in successive stages of increasing pressure and temperature and intervening periods of reduced pressure and temperature until the material finally attains a plastic condition while under high pressure.

10. The method of producing a hard and compact metal body which consists in subjecting a powdered metal mass, while in a mold and shielded from atmosphere and within a period of approximately five minutes of time, to a series of rapidly succeeding steps of simultaneously increasing temperature and pressure, and intervening periods of reduced pressure and temperature wherein the material is freed of generated gases, until a desired high pressure is attained as the materials attain alloying temperature.

FAY H. WILLEY.